(12) United States Patent
Eck

(10) Patent No.: US 7,376,387 B1
(45) Date of Patent: May 20, 2008

(54) AUTOSCAN SYSTEM FOR DETERMINING TRANSLATION BETWEEN SATELLITE AND CABLE FREQUENCIES

(75) Inventor: John Eck, Kenosha, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 0 days.

(21) Appl. No.: 09/474,911

(22) Filed: Dec. 28, 1999

(51) Int. Cl.
*H04H 7/00* (2006.01)

(52) U.S. Cl. .................................. 455/3.06; 725/151

(58) Field of Classification Search .................. 725/89, 725/139, 70, 63, 39, 48, 49, 151; 348/731; 455/3.02, 12.1, 13.2, 3.06, 526, 77, 150.1
See application file for complete search history.

(56) References Cited

U.S. PATENT DOCUMENTS

| | | | |
|---|---|---|---|
| 6,133,910 A * | 10/2000 | Stinebruner | 725/49 |
| 6,493,873 B1 * | 12/2002 | Williams | 725/78 |
| 6,496,229 B1 * | 12/2002 | Limberg | 348/725 |
| 2002/0056140 A1 * | 5/2002 | Oishi et al. | 725/148 |
| 2003/0133051 A1 * | 7/2003 | Oishi et al. | 348/735 |

\* cited by examiner

*Primary Examiner*—Tu Nguyen

(57) ABSTRACT

A translation table is provided for a set top box in order to convert satellite frequencies of a Satellite Master Antenna Television (SMATV) system to corresponding cable frequencies of a CATV distribution system. During an autoscan operation, the translation table is automatically populated with satellite frequencies and their associated cable frequencies. The satellite frequencies carry satellite QPSK signals, and the cable frequencies carry corresponding QAM signals. During autoscan, the cable frequencies are scanned. For each of the cable frequencies carrying a QAM signal, satellite service data is read from the corresponding QAM signal. The satellite service data includes the satellite frequencies. The satellite frequency contained in the satellite service data read from each QAM signal is stored in the translation table in association with the corresponding cable frequency.

29 Claims, 1 Drawing Sheet

AUTOSCAN SYSTEM FOR DETERMINING TRANSLATION BETWEEN SATELLITE AND CABLE FREQUENCIES

TECHNICAL FIELD OF THE INVENTION

The present invention relates to an autoscan system that determines a translation between satellite television frequencies and cable television frequencies.

BACKGROUND OF THE INVENTION AND PRIOR ART

Satellite Master Antenna Television (SMATV) systems currently receive analog television signals from satellites and distribute these analog television signals by way of a cable to a plurality of users. For example, SMATV systems may be used in high rise apartment buildings. It is desirable to similarly distribute digital television signals received from satellites.

While it is possible to directly distribute the L-band signals from a digital satellite service to receivers, a direct distribution arrangement would require the addition of a costly and complex signal distribution system. An alternative to such a direct signal distribution system is to re-modulate each QPSK satellite signal to a QAM signal of the existing SMATV system, and to then supply the resulting QAM signal into a corresponding unused CATV channel of the SMATV system. This type of re-modulation is usually referred to as transmodulation. In transmodulation, a transmodulator converts the satellite signal to a QAM CATV signal by tuning to the QPSK satellite signal, by transmodulating the received QPSK satellite signal into a QAM signal, and by supplying the QAM signal over a corresponding unused CATV channel.

In addition, it is noted that digital satellite signals contain both the picture data that are used to generate television pictures and also service data that include the QPSK carrier frequency of the corresponding satellite channel as well as the data that must be processed in order to generate the video and audio for that satellite channel. Because the relationship between the CATV frequencies carrying the QAM transmodulated signals and the satellite frequencies of the original QPSK signals may vary from SMATV system to SMATV system, the service data contained in digital satellite signals is of no use to QAM set top boxes in tuning to the signals on the SMATV cable.

Therefore, another alternative might be to replace the satellite service data with cable TV service data that the set top box of the SMATV system could then recognize in order to ensure proper tuning. Unfortunately, this alternative requires the purchase, installation, and maintenance of very expensive equipment at each point of distribution.

A better alternative would be to store a frequency translation table in non-volatile memory of a set top box. This translation table would, therefore, contain the relationship between each satellite channel frequency indicated by the service data in the satellite signals and the corresponding unused cable channel frequency of the transmodulated signal. Accordingly, when a user selects a satellite channel, the set top box looks up the corresponding cable channel frequency in the translation table and tunes the CATV tuner to the proper cable channel frequency corresponding to the satellite frequency of the selected satellite channel.

A problem with this approach is the need for an accurate translation table to be loaded into the non-volatile memory of the set top box prior to or at the time of installation. However, as discussed above, there is no single relationship between satellite frequencies and the cable frequencies to which the satellite frequencies are transmodulated by the SMATV system that covers all SMATV systems. Therefore, loading such a table at the factory is impractical. Instead, the table could be manually loaded at the time of installation. Unfortunately, manual loading of the table at the time of installation would be tedious and time consuming and, as a result, would likely lead to entry errors.

The present invention permits automatic loading of a translation table at installation of a set top box. In order to implement this automatic loading, the set top box is arranged to scan through the entire CATV frequency spectrum in order to find all possible transmodulated QAM signals. As each QAM signal is found, the satellite frequency contained in the satellite service data of the QAM signal is read and is loaded into the translation table in association with the cable frequency at which the QAM signal was found. Accordingly, when a user desires to tune to a particular program in one embodiment of the present invention, the user selects the appropriate satellite channel, the satellite service data corresponding to the selected satellite channel is read, the satellite frequency contained in this satellite service data is used to read the corresponding cable frequency from the translation table, and the CATV tuner is tuned to that cable frequency.

SUMMARY OF THE INVENTION

In accordance with one aspect of the present invention, a method of generating a translation table correlating satellite frequencies to cable frequencies comprises the following steps: a) tuning to a cable frequency; b) reading satellite service data from a signal at the cable frequency, wherein the satellite service data includes an indicium of a satellite frequency; c) storing in a translation table the indicium in association with the cable frequency of step a); and, d) repeating steps a)-c) for other cable frequencies.

In accordance with another aspect of the present invention, a method is provided to generate a translation table that correlates satellite frequencies carrying satellite QPSK signals to cable frequencies carrying corresponding QAM signals. The method comprises the following steps: a) scanning the cable frequencies; b) for each of the cable frequencies carrying a QAM signal, reading satellite service data from the corresponding QAM signal, wherein the satellite service data includes a satellite frequency; and, c) storing in the translation table the satellite frequency contained in the satellite service data read from each QAM signal carried on a cable frequency, wherein each satellite frequency is stored in the translation table in association with a corresponding cable frequency.

In accordance with yet another aspect of the present invention, a translation table is stored on a computer readable storage medium. The translation table holds satellite frequency indicia and cable frequencies. The satellite frequency indicia correspond to satellite QPSK signals, and the cable frequencies correspond to cable QAM signals transmodulated from the QPSK signal. Each of the satellite frequency indicia as stored in the translation table uniquely corresponds to one of the cable frequencies.

In accordance with still another aspect of the present invention, a method is provided to find digitally modulated signals. Each of the digitally modulated signals has a corresponding frequency in a frequency spectrum. The method comprises the following steps: a) stepping through the frequency spectrum in frequency increments; b) testing each frequency increment for timing lock; and, c) determining that one of the digitally modulated signals is found at each frequency increment where timing lock is detected as a result of step b).

In accordance with a further aspect of the present invention, an apparatus finds digitally modulated signals. Each of the digitally modulated signals has a corresponding frequency in a frequency spectrum. The apparatus comprises a scanner and a detector. The scanner is arranged to scan through the frequency spectrum in frequency increments. The detector is arranged to detect timing lock at each frequency increment and to determine that each frequency increment where timing lock is detected corresponds to one of the digitally modulated signals.

BRIEF DESCRIPTION OF THE DRAWINGS

These and other features and advantages of the present invention will become more apparent from a detailed consideration of the invention when taken in conjunction with the drawings in which.

DESCRIPTION OF THE PREFERRED EMBODIMENT

Because there is no fixed frequency relationship between satellite frequencies and cable frequencies, the autoscan feature of the present invention automatically finds QAM signals at any frequency within the cable frequency range. To find theses QAM signals, the autoscan feature of the present invention attempts to acquire signal lock first at the lowest frequency of the full scanning range, and then increments the frequency for each subsequent attempt to acquire signal lock until the highest frequency of the full scanning range is attained. However, it should be understood that any other frequency searching pattern may be utilized in the present invention. For example, the autoscan feature of the present invention may be arranged to attempt to acquire signal lock first at the highest frequency of the full scanning range, and then to decrement the frequency for each subsequent attempt to acquire signal lock until the lowest frequency of the full scanning range is attained.

The size of the frequency step should be sufficiently small to ensure that the QAM signals on all of the used CATV channels will at some point be locked. However, it is noted that the smaller the step size, the greater the amount of time required to perform the full scan. In addition, as the number of possible baud rates and QAM modulation types that must be tried during the scan increase, so does the required scanning time. Therefore, it is important to balance the size of a scanning step with scanning speed.

Figure 1:
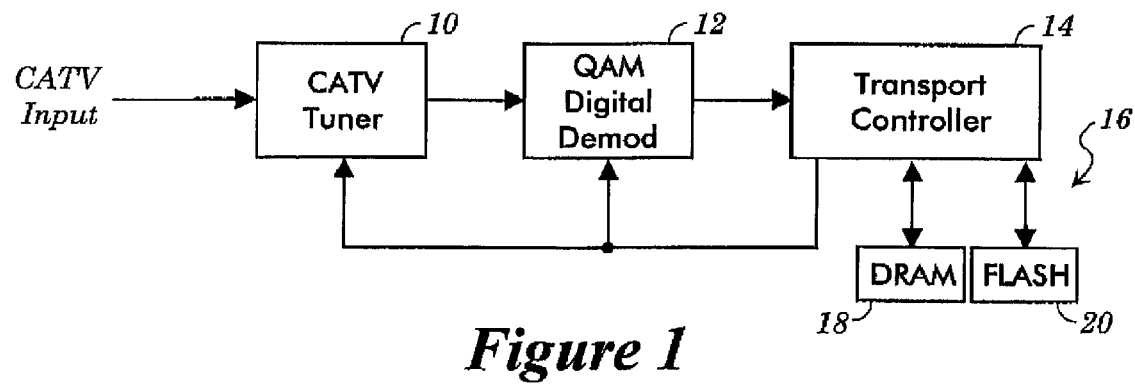
FIG. 1 illustrates an arrangement for populating a translation table in accordance with the present invention; and, FIG. 2 illustrates a portion of the arrangement of FIG. 1 in additional detail.

Accordingly, as shown in FIG. 1, a CATV set top box includes a CATV tuner 10 that tunes to a CATV channel from a transmodulator, and a QAM digital demodulator 12 that demodulates the QAM signal at the output of the CATV tuner 10, providing the demodulated signal to a transport controller 14. As will be discussed below, the transport controller 14 is microprocessor based and may be programmed to control any of the commercially available QAM digital demodulators so that any of these known demodulators may be used as the QAM digital demodulator 12. The transport controller 14 is also provided with memory 16 that may include, for example, a DRAM 18 and a flash memory 20.

The transport controller 14 tunes the CATV tuner 10 to a predetermined frequency and initializes selected registers of the QAM digital demodulator 12 involving functions related to QAM type, baud rate, and the like. The transport controller 14 also (i) closes the automatic gain control (AGC) loop of the QAM digital demodulator 12 in order to provide the correct signal level into the analog-to-digital converter of the QAM digital demodulator 12, (ii) controls the QAM digital demodulator 12 to obtain timing lock, (iii) locks the carrier derotator of the QAM digital demodulator 12 to the remaining carrier offset at the output of the CATV tuner 10 in order to obtain synchronization, and (iv) obtains Forward Error Correction (FEC) lock.

According to a first embodiment of the present invention, scanning for signals involves stepping through the entire frequency band of the CATV system and attempting to acquire a QAM signal at each step. Because the carrier lock function in typical QAM digital demodulators can resolve carrier offsets of ±100 kHz, the step size is limited to 200 kHz. However, resolution of typical CATV tuners is 62.5 kHz so that, realistically, the step size could be 187.5 kHz. Therefore, if 800 MHZ of spectrum is to be scanned, over 4200 acquisition attempts are required using a step size of 187.5 kHz, assuming that there is only one baud rate and QAM mode to be scanned.

As each QAM signal is acquired using this scanning methodology, the satellite frequency is read from the service data contained in the acquired QAM signal. This satellite frequency is stored in the translation table in association with the CATV frequency at which the QAM signal just acquired was found.

Although this type of scanning can be implemented for the present invention, a dedicated process may instead be implemented in accordance with a second embodiment of the present invention in order to find the QAM signals in a faster and more consistent manner. According to this embodiment of the present invention, timing lock in the form of symbol rate lock is used as the primary basis for determining signal acquisition. Timing lock as an indicator of the possible presence of a QAM signal has several characteristics in a typical QAM digital demodulator.

First, timing lock is independent of carrier phase synchronization. Accordingly, carrier lock need not be acquired prior to testing for timing lock.

Second, timing lock can typically be acquired in the presence of higher carrier offsets than can be compensated for by the carrier derotator of the QAM digital demodulator 12. For example, in the case of a Broadcom BCM3118 CATV tuner/demodulator, timing lock can be acquired at offsets well in excess of 1 MHZ. This consideration is important because, without carrier lock, a certain amount of carrier offset will be present.

Third, timing lock works well under poor signal conditions.

Fourth, timing lock is not dependent on QAM mode (16 QAM, 32 QAM, 64 QAM, 128 QAM, 256 QAM).

The acquisition of timing lock as preferably implemented by the present invention begins by setting the CATV tuner 10 to a first predetermined frequency of the full scanning range. For example, this first predetermined frequency may be the lowest frequency of the full scanning range. If it is assumed that scanning begins with this lowest frequency, then the tuning frequency of the CATV tuner 10 is incremented in 1 MHZ steps, and a test for timing lock is made at each frequency step. Stepping in 1 MHZ increments and testing for timing lock is referred to herein as coarse scanning. When timing lock is successfully acquired at one of the coarse steps, the center frequency of the possible QAM carrier is then estimated. Attempts to acquire full lock, which includes carrier lock and forward error correction (FEC) lock, can then be attempted around the estimated center frequency in a zig-zag search pattern until the QAM signal is fully locked.

As each QAM signal is fully locked, the satellite frequency is read from the service data contained in the acquired QAM signal. This satellite frequency is stored in the translation table in association with the CATV frequency at which the QAM signal just acquired was found. Thereafter, coarse scanning for the next QAM signal can be resumed in 1 MHZ increments starting with a frequency that is 6 MHZ (or 8 MHZ, depending on channel size) above the QAM signal that was just found.

Figure 2:
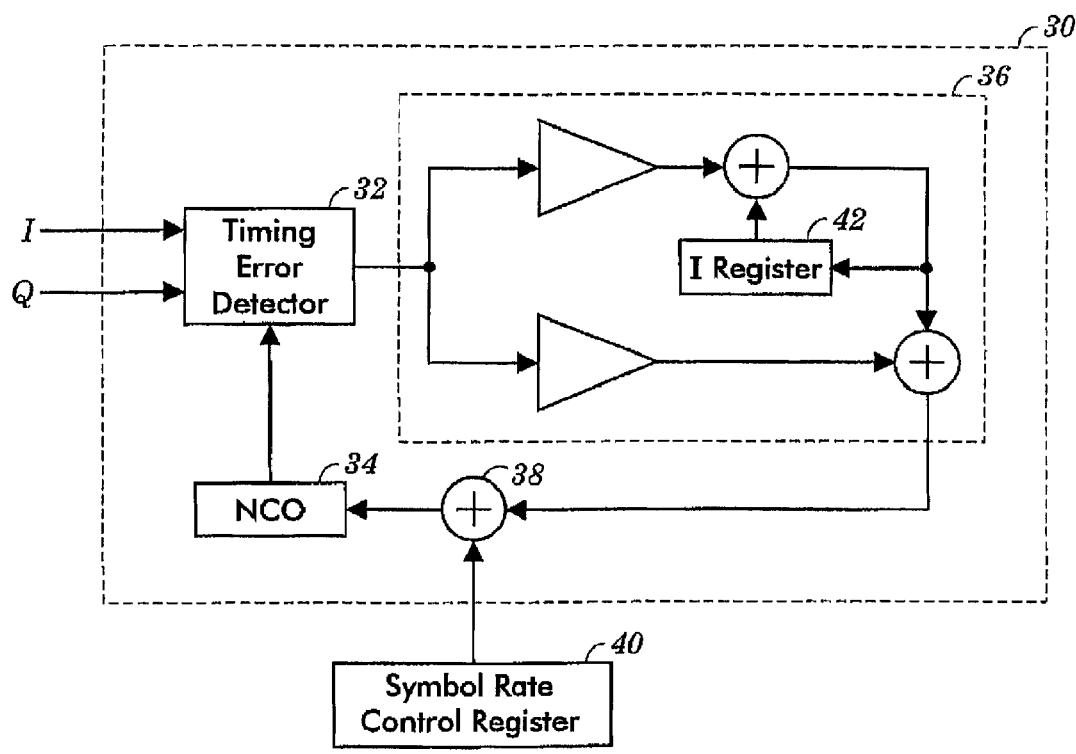

FIG. 2 illustrates a timing loop 30 that is the portion of the QAM digital demodulator 12 involved in the acquisition of timing lock as discussed above. Although the specific arrangement of the timing loop 30 may vary from demodulator to demodulator, the basic principles of a timing loop such as the timing loop 30 illustrated in FIG. 2 is the same for all or nearly all types of QAM digital demodulators.

A timing error detector 32 of the timing loop 30 receives the modulated and digitized I and Q signals as shown, and employs an algorithm in order to produce an output which is proportional to the difference in timing between the symbols of the I and Q signals and the output of a numerically controlled oscillator 34. Because the algorithm typically implemented by the timing error detector of a QAM digital demodulator is independent of carrier phase synchronization, timing lock can be acquired by the timing loop 30 prior to carrier lock.

The output of the timing error detector 32 is filtered by a timing loop filter 36, and a summer 38 sums this filtered output with a symbol rate provided by a symbol rate control register 40. The sum determined by the summer 38 controls the output frequency of the numerically controlled oscillator 34. Accordingly, at each frequency step supplied to the CATV tuner 10, the transport controller 14 can program the symbol rate control register 40 with all possible symbol rates in the system, one at a time, in an effort to acquire timing lock. Thus, for any programmed symbol rate provided to the symbol rate control register 40, the timing loop 30 finely controls an integrator register 42 of the timing loop filter 36 in an effort to acquire symbol timing synchronization. The instantaneous state of this fine control can be determined by reading the integrator value provided by the integrator register 42 of the timing loop filter 36. This integrator value is analogous to the voltage at the VCO input in a classic phase lock loop.

The transport controller 14 determines timing lock by taking multiple samples of the integrator value provided by the integrator register 42. When no QAM signal is present (i) at the frequency to which the transport controller 14 has currently set the CATV tuner 10 and (ii) near the symbol rate programmed into the symbol rate control register 40, the output of the timing error detector 32 varies randomly. Therefore, the integrator value provided by the integrator register 42 also varies randomly. However, in the presence of a QAM signal having a symbol rate at or near the symbol rate set by the symbol rate control register 40, the output of the timing error detector 32 will move the integrator value provided by the integrator register 42 such that the numerically controlled oscillator 34 is locked to the incoming symbol rate. When the numerically controlled oscillator 34 is locked to the incoming symbol rate, the integrator value of the integrator register 42 will fluctuate about some center value. (This fluctuation is due, at least in part, to noise and control loop parameters such as bandwidth and damping factor.)

Timing lock can be determined by the transport controller 14 by taking a number of samples (such as four) of the integrator value and by comparing the samples against pre-defined limits. For example, two characteristics may be derived from these samples, average and jitter. Accordingly, the sample average is compared to a predefined sample limit, and the jitter is compared to a predefined jitter limit.

The average is calculated by simply summing all of the samples and dividing this sum by the number of samples. Jitter is calculated by subtracting the minimum sample from the maximum sample.

If desired, both the sample average and the jitter may be converted to corresponding average symbols per second and jitter symbols per second. If so, each of the pre-defined limits may be defined as a percentage (or PPM) of the symbol rate to which the symbol rate control register 40 is currently set.

The predefined PPM limits influence the accuracy of the timing lock test. Therefore, optimum limits are preferably determined through empirical testing. Because these limits are largely influenced by the loop characteristics of the timing loop 30, optimum loop characteristics for gaining timing lock should be selected prior to empirical testing for the optimum limits.

A single test involving a single set of integrator value samples provides some degree of reliability in the determination of timing lock. This degree of reliability can be improved by performing multiple tests involving corresponding multiple sets of integrator values. For example, three tests, each involving a corresponding set of integrator value samples where each of the sets results from a slightly different value of symbol rate in the symbol rate control register 40, provide a substantial degree of reliability. The reason that the symbol rate value is slightly changed is so that the timing loop 30 will compensate for the change by bringing the timing loop 30 back into lock thereby producing a somewhat different set of samples of the integrator value.

In order to test for timing lock, a list of all possible symbol rates must be available to the installer. Thus, prior to the scanning process, the installer enters into memory of the transport controller 14 the list of all possible symbol rates and corresponding FEC rates that are used in the satellite transmission system. Symbol rates from originating satellites are entered in preference to QAM symbol rates because the satellite symbols rates are more likely to remain constant. QAM symbol rates vary with QAM mode.

From the entered list of satellite symbol rates, a list of demodulated bit rates can be ascertained. From the list of bit rates and all possible QAM modes that may be used, a list of all possible QAM symbol rates and their associated QAM modes can be generated. One timing lock attempt for each of these QAM symbol rates is made at each frequency during the coarse scanning phase.

The scanning procedure discussed above is thus implemented generally in three steps. First, coarse scanning is implemented. Coarse scanning is initiated by tuning the CATV tuner 10 to the lowest frequency in the full scanning range. At this frequency, a timing lock test is performed for each of the possible QAM symbol rates. If timing lock is not acquired at any of these QAM symbol rates, the CATV tuner 10 is advanced by 1 MHZ and timing lock tests are again performed. When timing lock is successful, there is a possibility that a QAM signal is nearby and is modulated at the symbol rate for which timing lock acquisition is successful. This symbol rate may be referred to as the possible_symrate.

Second, at this point, an estimate is made of the true center frequency of the QAM signal. This estimate is made by advancing the tuned frequency of the CATV tuner 10 by 500 kHz. A test is made for possible_symrate lock at this frequency. This test may use the average and jitter computations described above in testing for coarse lock. The tuned frequency of the CATV tuner 10 is then decreased in 62.5 kHz steps, and a test for possible_symrate lock is made at each step. The objective of this procedure is to find the edge at which symbol rate lock is achievable. Once the edge is found, an estimate of the center frequency of the QAM signal can be made.

If symbol rate lock at possible_symrate failed at three or more of the tested frequencies between 125 kHz above the original symbol lock frequency and 500 kHz above the original symbol lock frequency, it is likely that a QAM signal has not been detected and coarse scanning is resumed by advancing the frequency of the CATV tuner 10 by another 1 MHZ.

On the other hand, a channel edge is determined at the point at which three (or three out of four) consecutive symbol lock attempts fail below the frequency which is 125 kHz above the original symbol lock frequency. The center frequency estimate is made based upon this channel edge. A formula sufficient for estimating the difference between the edge of symbol rate lock and the true center frequency is dependent upon manufacturer and should be determined empirically. Also, this formula is symbol rate dependent. In the case of a Broadcom BCM3118 QAM tuner/demodulator, a suggested formula is given as follows: true center frequency=the edge frequency as determined above+300 kHz+3 times the baud rate.

Third, because the probability of signal presence is highest close to the estimated center of the QAM signal, the quickest way statistically to find the QAM signal is to implement a zig-zag search for the true center. For example, a test is first made at the estimated center, then at +62.5 kHz from this estimated center, then at -62.5 kHz from this estimated center, then at +125 kHz from this estimated center, then at -125 kHz from this estimated center, and so on up ±1.25 MHZ until full lock of the QAM signal is achieved. Full lock is determined at the point where carrier lock, FEC lock, and synchronization are detected. The Broadcom BCM3118 CATV tuner/demodulator provide bits which can be read in order to determine when carrier lock, FEC lock, and synchronization have been achieved. If full lock is not achieved, another four zig-zag attempts are made before abandoning the search at the estimated center frequency. The search is also abandoned if timing lock, as a part of the process of gaining full lock, suddenly becomes no longer successful.

When a QAM signal is fully locked, the satellite frequency is read from the service data contained in the acquired QAM signal. This satellite frequency is entered into the translation table in association with the CATV frequency at which the QAM signal just acquired was found. Thereafter, coarse scanning for the next QAM signal can be resumed in 1 MHZ increments starting with a frequency that is 6 MHZ (or 8 MHZ, depending on channel size) above the QAM signal that was just found. This process continues until the scanning is completed through the entire full scanning range. At this point, the translation table, which is stored in memory of the set top box, holds a complete set of all satellite frequencies and their corresponding CATV frequencies.

Following completion of the autoscan, a user, who desires to tune to a satellite channel, may select a satellite channel. The satellite frequency for that selected satellite channel is read from the service data that is typically stored in the set top box's DRAM at each reset, this satellite frequency is used in turn to read the CATV channel from the translation table, and the CATV tuner of the set top box is tuned to this CATV channel.

Certain modifications of the present invention have been discussed above. Other modifications will occur to those practicing in the art of the present invention. For example, as discussed above, an estimate of a QAM signal center frequency is made by advancing the tuned frequency of the CATV tuner 10 by 500 kHz from the last 1 MHZ step at which possible lock was detected. Instead, other procedures can be implemented for estimating the center frequency. For example, an estimate of a QAM signal center frequency can be made by decreasing the tuned frequency of the CATV tuner 10 by 500 kHz when coarse scanning for timing lock in a downward direction, or by using any other step size.

Also, many QAM demodulators have a timing lock detection flag which is set when the demodulator determines timing lock. In these cases, sampling of the timing loop integrator value in order to determine timing lock is not necessary.

Moreover, as described above, the translation table holds satellite frequency, CATV frequency pairs. Instead, the translation table could hold satellite channel number, CATV frequency pairs.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method performed by an apparatus of generating a translation table correlating satellite frequencies to cable frequencies comprising the following steps:
   a) tuning to a cable frequency;
   b) reading satellite service data from a signal at the cable frequency, wherein the satellite service data includes an indicium of a satellite frequency;
   c) storing in a translation table the indicium in association with the cable frequency of step a); and,
   d) repeating steps a)-c) for other cable frequencies.

2. The method of claim 1 wherein step a), in response to step d), comprises the step of scanning through a scanning range using a plurality of frequency increments.

3. The method of claim 2 wherein each of the frequency increments is less than a bandwidth of a cable channel, and wherein step b) comprises the following steps:
   b1) determining whether there is a signal at a current frequency increment; and,
   b2) if there is a signal at the current frequency increment, reading satellite service data from the signal and then invoking steps c), a), and d) to step to a next frequency increment.

4. The method of claim 2 wherein each of the frequency increments is less than a bandwidth of a cable channel, and wherein step b) comprises the following steps:
   b1) testing for timing lock at a current frequency increment;

b2) if there is timing lock, determining a center frequency of a signal corresponding to the current frequency increment; and, b3) reading satellite service data from the signal at the center frequency.

5. The method of claim 4 wherein the frequency increments are first frequency increments, wherein step b1) comprises the step of estimating the center frequency of a signal, wherein step b2) comprises the step of determining a true center frequency by performing a zig-zag frequency search from the estimated center frequency using a plurality of second frequency increments, wherein each of the second frequency increments is less than the first frequency increments, and wherein step b3) comprises the step of reading satellite service data from the signal at the true center frequency.

6. The method of claim 5 wherein the estimating step comprises the step of incrementing the cable frequency by a third frequency increment, and wherein the third frequency increment is less than the first frequency increments.

7. The method of claim 6 wherein the step of incrementing the cable frequency by a third frequency increment comprises the step of decrementing down from the third frequency increment in order to find a channel edge.

8. The method of claim 4 wherein step b1) comprises the step of determining timing lock if an integrator value of a timing loop varies about a center value.

9. The method of claim 8 wherein the step of determining timing lock comprises the step of determining an average and a jitter for the integrator value.

10. The method of claim 1 wherein the indicium comprises a satellite frequency.

11. The method of claim 1 wherein the indicium comprises a channel number.

12. A method performed by an apparatus of generating a translation table correlating satellite frequencies carrying satellite QPSK signals to cable frequencies carrying corresponding QAM signals, the method comprising the following steps:

a) scanning the cable frequencies;

b) for each of the cable frequencies carrying a QAM signal, reading satellite service data from the corresponding QAM signal, wherein the satellite service data includes a satellite frequency; and, c) storing in the translation table the satellite frequency contained in the satellite service data read from each QAM signal carried on a cable frequency, wherein each satellite frequency is stored in the translation table in association with a corresponding cable frequency.

13. The method of claim 12 wherein step a) comprises the step of scanning through a scanning range using a plurality of frequency increments.

14. The method of claim 13 wherein each of the frequency increments is less than a bandwidth of a cable channel, and wherein step b) comprises the following steps:

b1) determining whether there is a QAM signal at each frequencies increment; and, b2) reading satellite service data from each of the QAM signals found as a result of step b1).

15. The method of claim 13 wherein each of the frequency increments is less than a bandwidth of a cable channel, and wherein step b) comprises the following steps:

b1) testing for timing lock at each frequency increment;

b2) for each frequency increment at which there is timing lock, determining a center frequency of a QAM signal; and, b3) reading satellite service data from the QAM signal.

16. The method of claim 15 wherein each of the frequency increments is a first frequency increment, wherein step b2) comprises the following steps:

b2-1) estimating the center frequency of a QAM signal; and, b2-2) determining a true center frequency by performing a zig-zag frequency search from the estimated center frequency using a plurality of second frequency increments, wherein each of the second frequency increments is less than the first frequency increments;

and wherein step b3) comprises the step of reading satellite service data from the signal at the true center frequency.

17. The method of claim 16 wherein step b2-1) comprises the step of incrementing the cable frequency by a third frequency increment, and wherein the third frequency increment is less than the first frequency increments.

18. The method of claim 17 wherein the step of incrementing the cable frequency by a third frequency increment comprises the step of decrementing down from the third frequency increment in order to find a channel edge.

19. The method of claim 15 wherein step b1) comprises the step of determining timing lock if an integrator value of a timing loop varies about a center value.

20. The method of claim 19 wherein the step of determining timing lock comprises the step of determining an average and a jitter for the integrator value.

21. The method of claim 13 wherein each of the frequency increments is less than a bandwidth of a cable channel, and wherein step b) comprises the following steps:

b1) at each frequency increment, testing for timing lock at each of a plurality of QAM modes;

b2) for each frequency increment and QAM mode at which there is timing lock, determining a center frequency of a QAM signal; and, b3) reading satellite service data from the QAM signal.

22. The method of claim 21 wherein each of the frequency increments is a first frequency increment, wherein step b2) comprises the following steps:

b2-1) estimating the center frequency of a QAM signal if timing lock is determined at a QAM mode; and, b2-2) determining a true center frequency by performing a zig-zag frequency search from the estimated center frequency using a plurality of second frequency increments, wherein each of the second frequency increments is less than the first frequency increments;

and wherein step b3) comprises the step of reading satellite service data from the signal at the true center frequency.

23. The method of claim 22 wherein step b2-1) comprises the step of incrementing the cable frequency by a third frequency increment, and wherein the third frequency increment is less than the first frequency increments.

24. The method of claim 23 wherein the step of incrementing the cable frequency by a third frequency increment comprises the step of decrementing down from the third frequency increment in order to find a channel edge.

25. The method of claim 21 wherein step b1) comprises the step of determining timing lock if an integrator value of a timing loop varies about a center value.

26. The method of claim 25 wherein the step of determining timing lock comprises the step of determining an average and a jitter for the integrator value.

27. The method of claim 1 wherein step c) comprises storing satellite frequency indicia and cable frequencies, wherein the satellite frequency indicia correspond to satellite QPSK signals, wherein the cable frequencies correspond to cable QAM signals transmodulated from the QPSK signals, and wherein each of the satellite frequency indicia as stored in the translation table uniquely corresponds to one of the cable frequencies.

28. The method of claim 27 wherein the satellite frequency indicia comprise satellite frequencies.

29. The method of claim 27 wherein the satellite frequency indicia comprise channel numbers.

* * * * *